(12) United States Patent
Raatz

(10) Patent No.: US 8,904,763 B2
(45) Date of Patent: Dec. 9, 2014

(54) EXHAUST GAS APPARATUS OF AN INTERNAL COMBUSTION ENGINE

(75) Inventor: Thorsten Raatz, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 587 days.

(21) Appl. No.: 12/921,851

(22) PCT Filed: Jan. 21, 2009

(86) PCT No.: PCT/EP2009/050655
§ 371 (c)(1),
(2), (4) Date: Sep. 10, 2010

(87) PCT Pub. No.: WO2009/112295
PCT Pub. Date: Sep. 17, 2009

(65) Prior Publication Data
US 2011/0005201 A1    Jan. 13, 2011

(30) Foreign Application Priority Data

Mar. 10, 2008   (DE) .......................... 10 2008 013 405

(51) Int. Cl.
| | |
|---|---|
| *F01N 3/00* | (2006.01) |
| *F01N 3/10* | (2006.01) |
| *F01N 13/00* | (2010.01) |
| *F01N 3/20* | (2006.01) |

(52) U.S. Cl.
CPC ........... *F01N 3/2066* (2013.01); *F01N 2610/02* (2013.01); *F01N 13/009* (2014.06); *F01N 2250/00* (2013.01); *Y02T 10/24* (2013.01); *F01N 13/011* (2014.06); *F01N 2570/10* (2013.01)
USPC ................... 60/286; 60/287; 60/288; 60/301; 60/303

(58) Field of Classification Search
CPC ............. F01N 3/2066; F01N 2610/02; F01N 2900/1616; F01N 3/208; F01N 3/101; F01N 3/2053; F01N 3/2892; F01N 2410/00; Y02T 10/6221; F02D 9/04
USPC ........................... 60/286–288, 295, 301, 303
See application file for complete search history.

(56) References Cited

U.S. PATENT DOCUMENTS

| | | | |
|---|---|---|---|
| 6,170,259 B1 * | 1/2001 | Boegner et al. ................. | 60/286 |
| 6,832,473 B2 * | 12/2004 | Kupe et al. ...................... | 60/286 |
| 7,334,400 B2 * | 2/2008 | Yan et al. ........................ | 60/286 |

(Continued)

FOREIGN PATENT DOCUMENTS

| | | |
|---|---|---|
| DE | 19529835 A1 | 2/1997 |
| DE | 10243270 A1 | 3/2004 |

(Continued)

*Primary Examiner* — Thomas Denion
*Assistant Examiner* — Diem Tran
(74) *Attorney, Agent, or Firm* — Michael Best & Friedrich LLP

(57) ABSTRACT

The invention is an exhaust gas apparatus of an internal combustion engine, in particular of an internal combustion engine with gasoline direct injection. The exhaust gas apparatus includes at least one selective catalytic converter. It is provided that a first catalytic converter is positioned upstream of the selective catalytic converter. The invention also provides a method for the purification of exhaust gas of an internal combustion engine, in an internal combustion engine with gasoline direct injection, for use in such an exhaust gas apparatus. In the method the selective catalytic converter is preceded by a first catalytic converter disposed upstream therefrom.

8 Claims, 2 Drawing Sheets

(56) References Cited

U.S. PATENT DOCUMENTS

| | | | |
|---|---|---|---|
| 7,343,736 B2 * | 3/2008 | Kalish | 60/288 |
| 7,984,609 B2 * | 7/2011 | Doring et al. | 60/286 |
| 8,181,445 B2 * | 5/2012 | Duvinage et al. | 60/286 |
| 2005/0091968 A1 | 5/2005 | van Nieuwstadt et al. | |
| 2005/0198942 A1 | 9/2005 | van Nieuwstadt et al. | |
| 2006/0196169 A1 | 9/2006 | Ripper et al. | |
| 2009/0031711 A1 | 2/2009 | Braun et al. | |

FOREIGN PATENT DOCUMENTS

| | | | |
|---|---|---|---|
| DE | 102005-035555 | * | 2/2007 |
| DE | 102005035555 A1 | | 2/2007 |
| JP | 2007023997 A | | 2/2007 |
| WO | 2006010506 A1 | | 2/2006 |

* cited by examiner

EXHAUST GAS APPARATUS OF AN INTERNAL COMBUSTION ENGINE

CROSS-REFERENCE TO RELATED APPLICATION

This application is a 35 USC 371 application of PCT/EP2009/050655 filed on Jan. 21, 2009.

BACKGROUND OF THE INVENTION

1. Field of the Invention

The invention relates to an exhaust gas apparatus of an internal combustion engine, in particular an internal combustion engine with direct gasoline injection, having at least one selective catalytic converter. The invention further relates to a method for cleaning the exhaust gas from an internal combustion engine, in particular an internal combustion engine with direct gasoline injection, in particular for use in an exhaust gas apparatus.

2. Description of the Prior Art

The fuel consumption of Otto engines, especially Otto engines with direct gasoline injection, can be reduced markedly in the partial-load range with the aid of combustion with air excess and by means of charge stratification. Pronounced advantages in combustion in the lowest load range (to some extent above 30%) and in the relevant travel cycle can be achieved by a reduction in intake throttle losses, a thermodynamically more-favorable gas composition, and in certain ranges, reduction of the wall heat losses. However, the lean mixture composition prevents a desired high reduction of nitrogen oxides in the three-way catalytic converter, and for that reason, to achieve more-favorable exhaust gas values, special $NO_x$ reservoir systems and $deNO_x$ catalytic converters are used. The prerequisite is low-sulfur fuel, but it is not extensively available worldwide, which restricts its use in certain markets. Moreover, the advantage in efficiency attained by charge stratification is reduced by the necessary regeneration of the $deNO_x$ catalytic converter, and there are additional cost disadvantages in comparison to conventional exhaust gas posttreatment systems.

One effective method for removing nitrogen oxides ($NO_x$) in oxygen-containing exhaust gases is the possibility of reducing these nitrogen oxides to nitrogen and water via selective catalytic reaction (SCR). As the reducing agent, ammonia ($NH_3$) is used, which in mobile applications for safety reasons is carried in the vehicle in only slight quantities and released as needed in small quantities from an $NH_3$ buffer store, such as a urea-water solution (or AdBlue™) or from solids, such as ammonium carbamate, ammonium carbonate, and the like, and is metered into the exhaust gas. In the diesel utility vehicle sector, such systems are already in use.

However, in Otto engines, especially those with direct gasoline injection, such systems cannot be used for lack of high-temperature resistance of the selective catalytic converters. Moreover, the selective catalytic process is impeded vulnerably by the hydrocarbons that are present in the exhaust gases from Otto engines. Precisely at high load, direct gasoline injection engines are not run lean but rather with what is called a stoichiometric air ratio ($\lambda=1$ concept), with the consequence of relatively high nitrogen oxide and hydrocarbon emissions. Cold starting also takes place in the $\lambda=1$ mode, to avoid misfiring at cold engine temperatures.

OBJECT AND SUMMARY OF THE INVENTION

The object of the invention is to furnish a selective catalytic preparation of exhaust gases from an internal combustion engine, in particular an internal combustion engine with direct gasoline injection, which avoids the aforementioned disadvantages and enables the most effective possible denitrification of the exhaust gases over a wide operating range.

To that end, an exhaust gas apparatus of an internal combustion engine, in particular an internal combustion engine with direct gasoline injection, having at least one selective catalytic converter, is proposed in which it is provided that the selective catalytic converter is preceded by a first catalytic converter. The first catalytic converter preceding the selective catalytic converter removes the hydrocarbon components from the exemplary embodiment, which are harmful to the selective catalytic converter, and at $\lambda=1$, it also removes CO and $NO_x$ components, so that good exhaust gas cleaning is attained from the very outset. The first catalytic converter is especially advantageously embodied as a three-way catalytic converter of known construction, but with a comparatively compact volume. In known three-way catalytic converters, a very good conversion precisely of hydrocarbon components, CO components, and nitrogen oxides can be attained in an operating range in which $\lambda$ is approximately $=1$. With a relatively compact structure of this first catalytic converter, fast thorough warming can also be attained, so that the onset of effectiveness of the first catalytic converter is very fast.

In a further embodiment, the first catalytic converter is disposed upstream of an inlet point of reducing agent of the selective catalytic converter. As the reducing agent, the reducing agents already mentioned and known from the prior art can be considered, such as ammonia ($NH_3$) in the known forms of administration, such as urea-water solution (or AdBlue). The removal of hydrocarbons that are harmful to the catalytic reaction can accordingly be done even before the mixing of the exhaust gas, which is to be cleaned and denitrified, with the reducing agent, so that once again, unwanted influences are precluded.

In a further embodiment, it is provided that a second catalytic converter follows the selective catalytic converter. The second catalytic converter is preferably also embodied as a three-way catalytic converter of known function and design, and this catalytic converter acts as the main catalytic converter for final treatment of the exhaust gas.

An embodiment in which a volume-adjusting and closure device is connected parallel to a series circuit of the first catalytic converter and the selective catalytic converter is preferred. The volume-adjusting and closure device serves as a kind of bypass to carry the volumetric exhaust gas stream from the series circuit (formed of the first catalytic converter and the selective catalytic converter), or parallel to it and past it, and preferably the volume-adjusting and closure device permits a continuously variable adjustment of the volumetric stream of exhaust gas, so that the volumetric stream of exhaust gas can be guided entirely through the series circuit, or both through the series circuit and past it in volumetric stream proportions to be predetermined. It can thus be prevented that the first catalytic converter, also in the form of a cold start catalytic converter preferably disposed near the engine for very fast thorough warming, will overheat in certain load states, in which a very high volumetric stream of exhaust gas at high temperature occurs; it can also be prevented that the selective catalytic converter, following the first catalytic converter, will be burdened in operating states in which that is unnecessary.

In a further preferred embodiment, a parallel circuit of the volume-adjusting and closure device on the one hand (the bypass) and the series circuit of the first catalytic converter and the selective catalytic converter on the other are followed by the second catalytic converter. The second catalytic converter, which in a sense can be considered the main catalytic converter, is accordingly always subjected to all the exhaust gas from the engine, and the volumetric stream of exhaust gas, in one position of the volume-adjusting and closure device is carried from the engine predominantly (because of the flow resistances) directly to the second catalytic converter and converted there, while conversely, in a different position of the volume-adjusting and closure device, the volumetric stream of exhaust gas is first carried through the first catalytic converter (the cold start catalytic converter) and the selective catalytic converter connected in series with it, and then is delivered to the second catalytic converter (the main catalytic converter). Precisely in the cold starting mode, this latter variant is appropriate, since because of the first catalytic converter, which is installed near the engine and therefore warms up and becomes effective quite quickly, very good removal is attained of precisely those hydrocarbons that are harmful to the downstream selective catalytic converter, and the selective catalytic converter already achieves very good denitrification of the exhaust gas quite soon after the cold start. Until the selective catalytic converter is sufficiently effective, the denitrification is achieved already by the first catalytic converter, as a three-way catalytic converter. Precisely in the cold-starting mode, in Otto engines the engine is operated at $\lambda=1$, so that a relatively high proportion of hydrocarbon, to be removed by the first catalytic converter, is contained in the exhaust gas, and at the same time, the first catalytic converter near the engine heats up thoroughly fast enough to develop this effect quickly. Advantageously, precisely the conversion capacity of the selective catalytic converter is improved here; for high conversion rates in the cold state (for instance at temperatures of less than 250° C.) requires a proportion of $NO_2$ of up to 50% in the volumetric stream of exhaust gas in order to develop its full effect. Such a high conversion rate cannot be attained from the beginning with the cold selective catalytic converter, however, since the volumetric stream of exhaust gas in cold Otto engines contains relatively little $NO_2$. Advantageously, the first catalytic converter, which precedes the selective catalytic converter upstream in the series circuit, nevertheless oxidizes a portion of the nitrogen monoxide NO into nitrogen dioxide $NO_2$, so that in this way, the $NO_2$ proportion in the exhaust gas delivered to the selective catalytic converter is increased markedly, and as a result its effectiveness in the cold state is improved considerably. At the same time, the hydrocarbon components, highly unwanted in the cold state of the selective catalytic converter, in the exhaust gas are removed by the first catalytic converter, namely oxidized, and in turn the conversion rates of the selective catalytic converter can be improved markedly. Since the first catalytic converter, near the engine, can already convert hydrocarbons and carbon monoxide at low temperatures, the heating up of the downstream selective catalytic converter can be speeded up, so that its full effectiveness ensues very much faster. If the second catalytic converter, or main catalytic converter, must possibly be disposed farther from the engine because of these designs, then particularly in cold starting, a slightly lower conversion rate of the main catalytic converter (or second catalytic converter) can at least be compensated for by the first catalytic converter disposed near the engine, and a better outcome overall for the catalytic converter arrangement may even be achieved.

In another embodiment, the first catalytic converter experiences the flow through it of the entire exhaust gas stream or volumetric exhaust stream from the engine. In a different way from the exemplary embodiments described above, the disposition of the first catalytic converter as a cold start catalytic converter is such that it always experiences the entire exhaust gas stream from the engine, or in other words is not at least partly taken out of the volumetric stream of exhaust gas as a result of a bypass of the volume-adjusting and closure device. In this way, it is possible to design the second catalytic converter (that is, the main catalytic converter in the known three-way catalytic converter technique) as substantially smaller and more economical, and furthermore, installation space can advantageously be economized on, space that would have been necessary for a large three-way catalytic converter that is usual in the prior art. Here the first catalytic converter already reduces a large proportion of the emissions, so that now the second catalytic converter has to convert only lesser proportions of hydrocarbon, carbon monoxide and $NO_x$ components. At very high exhaust gas temperatures, however, adequate temperature resistance of the first catalytic converter must be provided for; unwanted overheating of the first catalytic converter can be counteracted for instance by active component protection provisions, such as enriching the mixture; at the same time, heat dissipation provisions known from the prior art can be considered, which can optionally be turned on and off again as needed, for instance as a function of a temperature of the first catalytic converter, which is intended to be detected by suitable devices. To the extent that such provisions as mixture enrichment are employed, this should be preferably provided in operating states of the kind in which the mixture enrichment is usual in the prior art any way, so as to protect other components, for instance, such as a pipe elbow or exhaust gas turbocharger, against overheating. Since in contrast to the embodiments described above, no branching in the exhaust tract has to be provided upstream of the first catalytic converter, the first catalytic converter can be installed quite close to the engine, so that not only extremely fast heating up, even in cold starting, but also higher operating temperatures, even in the low load range, can be attained.

In a further preferred embodiment, a series circuit of the first catalytic converter and of a circuit arrangement is provided, which is formed by a parallel circuit of the volume-adjusting and closure device and the selective catalytic converter. Consequently, as described above, the first catalytic converter is disposed near the engine, and the entire stream of exhaust gas from the engine flows through it. Downstream of it in series is a parallel circuit, which is formed by the selective catalytic converter and the volume-adjusting and closure device connected parallel to the selective catalytic converter. Accordingly, the selective catalytic converter experiences the flow of the exhaust gas volumetric stream, as a function of the line cross sections of the piping connecting it in the exhaust tract and as a function of the position of the volume-adjusting and closure device. The volume-adjusting and closure device here can be either fully closed, fully open, or in an intermediate position. Depending on the applicable flow resistance, which results from the position of the volume-adjusting and closure device and from the piping of the exhaust tract, a more or less large proportion of the exhaust gas volumetric stream is carried via the selective catalytic converter or past it. Depending on the embodiment and requirements of the particular engine and also on the results desired with regard to exhaust gas cleaning, many embodiments with regard to the proportional flow through the system can be provided.

In a further preferred embodiment, this series circuit is followed by the second catalytic converter. Accordingly, the second catalytic converter is located downstream of the circuit arrangement described above and no longer necessarily has to be embodied as a large-volume main catalytic converter, since a substantial proportion of the three-way reaction takes place in the first catalytic converter, since the latter always has the entire exhaust gas volumetric stream from the engine flowing through it.

In a further preferred embodiment, the first catalytic converter has a reaction layer, which comprises the elements platinum or rhodium, or a combination or connection of the two elements, and/or has these elements and/or compounds of these elements. In this embodiment, it can very advantageously be ensured that the $NO_2$ proportion in the lean mode is raised sufficiently to allow the selective catalytic converter to become effective quite quickly. Unlike the conventional three-way catalytic converter coating (palladium/rhodium, for instance) known in the prior art, here a reaction layer with the elements of platinum and/or rhodium is used, which advantageously enables raising the $NO_2$ proportion in the lean mode upstream of the selective catalytic converter.

A method for exhaust gas cleaning of exhaust gas from an internal combustion engine, in particular an internal combustion engine with direct gasoline injection, is proposed, in particular for use in an exhaust gas apparatus, as described above, having at least one selective catalytic converter. It is provided that the selective catalytic converter is preceded by a first catalytic converter. This disposition upstream of the first catalytic converter is done in a fixed arrangement here, or in such a way that via a volume-adjusting and closure device, the proportional flow through the first catalytic converter is either constant or can be regulated as needed.

BRIEF DESCRIPTION OF THE DRAWINGS

The invention will be described below in further detail in terms of two exemplary embodiments in conjunction with the drawings, in which.

DESCRIPTION OF THE PREFERRED EMBODIMENTS

Figure 1:
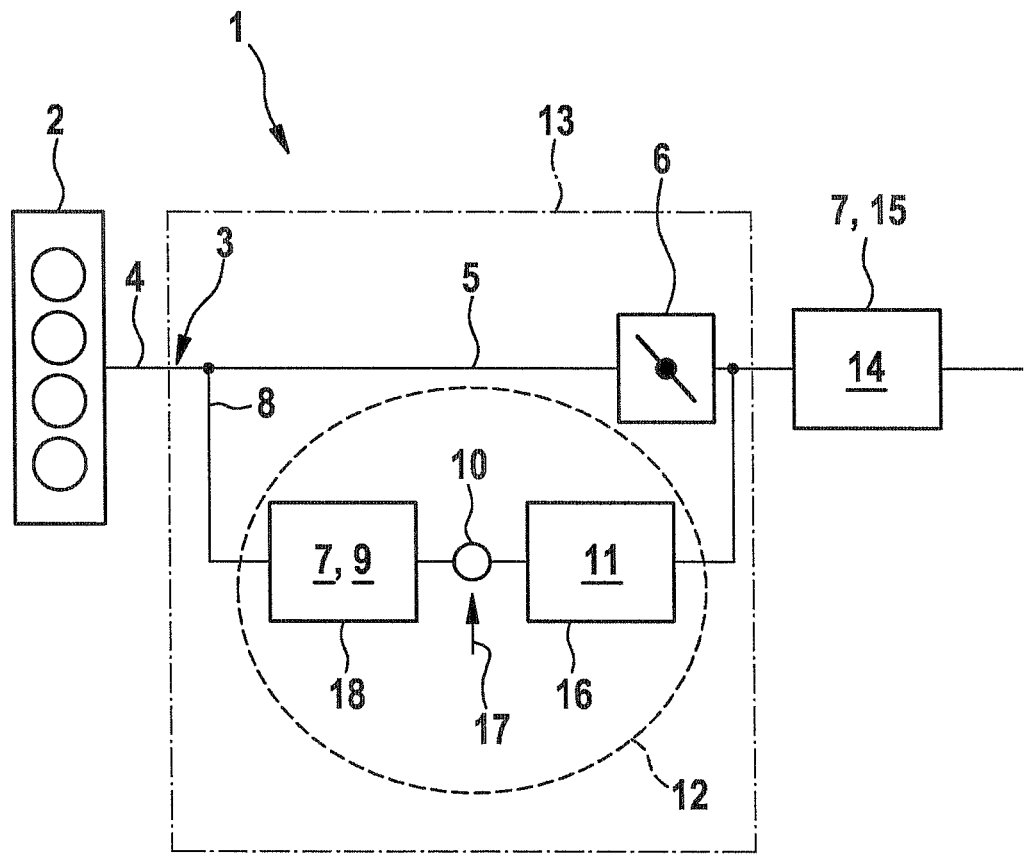
FIG. 1 shows an exhaust gas apparatus with a parallel circuit of a volume-adjusting and closure device and a series circuit of a first catalytic converter and a selective catalytic converter.

FIG. 1 shows an exhaust gas apparatus 1 of an internal combustion engine 2 in a symbolic, simplified illustration.

In a region 3 near the engine, an exhaust tract 4 is divided into a main branch 5, in which a volume-adjusting and closure device 6 is disposed, and a selective branch 8, which connected in series has a first catalytic converter 9, downstream of it an inlet point 10 for reducing agent, not shown, and the selective catalytic converter 11 following it downstream. The first catalytic converter 9 is a three-way catalytic converter 7. The series circuit 12, embodied of the first catalytic converter 9, the inlet point 10, and the selective catalytic converter 11, discharges downstream of the volume-adjusting and closure device 6 into the main branch 5, and with the volume-adjusting and closure device 6, it forms a parallel circuit 13. Downstream of the parallel circuit 13 is a second catalytic converter 14, which is embodied as a main catalytic converter 15 and which is a three-way catalytic converter 7. Depending on the position of the volume-adjusting and closure device 6, the exhaust gas stream from the engine 2 is conducted through the main branch 5 and through the selective branch 8, or, if the volume-adjusting and closure device 6 is closed, only through the selective branch 8. The selective catalytic converter 11 in the selective branch 8 is a so-called $deNO_x$ catalytic converter 16, which selectively performs the reduction of nitrogen oxides, with the addition of a reducing agent 17 (such as urea solution/ammonia gas/AdBlue) at the inlet point 10. The first catalytic converter 9 is embodied as a cold-start three-way catalytic converter 18, which in a preferable design near the engine, or in other words particularly in the region 3 near the engine, is subject to very fast warming and attainment of its operating temperature and thus becomes effective very quickly. Advantageously, harmful hydrocarbons, which would be harmful to the downstream selective catalytic converter 11, are removed from the exhaust gas stream very quickly. Precisely in the cold-starting mode, in Otto engines the $\lambda=1$ mode is employed, so that rapid heating of the first catalytic converter 9 (of the cold-start three-way catalytic converter 18) is attained with very fast removal of CO, $NO_x$ and hydrocarbon components in the exhaust gas stream. The conversion capacity of the downstream selective catalytic converter 11 as a $deNO_x$ catalytic converter 16 is likewise advantageously improved, since for high conversion rates in the cold state, for instance at temperatures of below 250° C., it requires an up to 50% $NO_2$ proportion in the exhaust gas volumetric stream in order to develop its full effect. In the upstream cold-start three-way catalytic converter 18, the high proportion of nitrogen monoxide contained in the exhaust gas stream from the cold engine 2 is oxidized into nitrogen dioxide $NO_2$, so that an increase of the $NO_2$ proportion in the exhaust gas stream takes place upon delivery to the selective catalytic converter 11. In this way, in the series circuit 12 of the cold-start three-way catalytic converter 18 and the selective catalytic converter 11, a very high conversion rate and good exhaust gas cleaning are already attained. The following second catalytic converter 14, as a main catalytic converter 15, heats up more slowly than the first catalytic converter 9, but this is compensated for by the very good effectiveness of the series circuit 12, as described above. Precisely in the cold-starting mode, the volume-adjusting and closure device 6 is accordingly put into a position that ranges from closed to only partly open, in order to conduct a large proportion of the exhaust gas stream through the cold-start three-way catalytic converter 18 and the following selective catalytic converter 11. Only with increasing heating of the engine 2 and of the second catalytic converter 14 is the volume-adjusting and closure device opened farther, to prevent overheating of the first catalytic converter 9 and to circumvent a stream through the selective catalytic converter 11 in operating states in which a very good conversion is attained in the second catalytic converter 14 as the main catalytic converter 15. In this way, in a very advantageous way, very good exhaust gas cleaning can be attained in all operating states of the engine 2.

Figure 2:
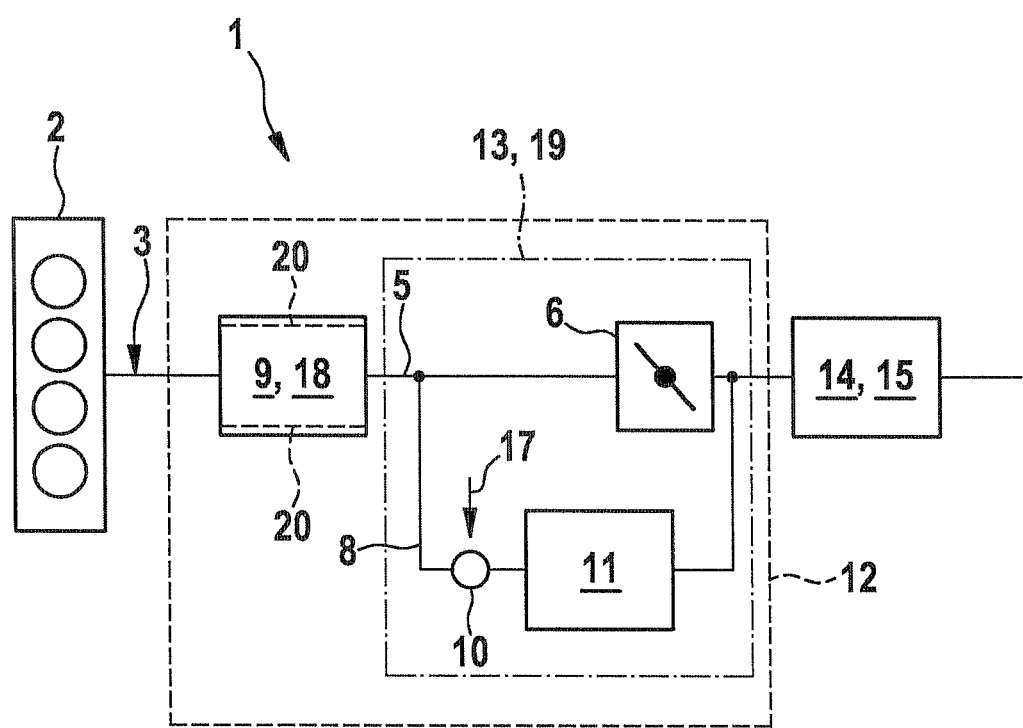
FIG. 2 shows an exhaust gas apparatus with a series circuit of the first catalytic converter and a circuit arrangement, the latter being formed by a parallel circuit comprising a volume-adjusting and closure device and a selective catalytic converter.

FIG. 2 shows the engine 2 with a different disposition of the exhaust gas apparatus 1, namely a series circuit 12 comprising the first catalytic converter 9, which is again installed in the region 3 near the engine, and a circuit arrangement 19, which is formed by a parallel circuit 13 of the volume-adjusting and closure device 6 and the selective catalytic converter 11. The selective catalytic converter 11 is preceded inside the circuit arrangement 19 upstream by the inlet point 10, through which reducing agent 17 is delivered to the exhaust gas stream upstream of the selective catalytic converter 11. The second catalytic converter 14 as a main catalytic converter 15 is downstream of the series circuit 12. With this arrangement, the first catalytic converter 9, as a cold-start three-way catalytic converter 18, constantly has a flow through it of the entire exhaust gas stream from the engine 2. The selective catalytic converter 11 has a flow through it of the exhaust gas stream of the engine 2, as a function of the line cross sections of the main branch 5 and selective branch 8, the latter having the selective catalytic converter 11 and the inlet point 10 within the parallel circuit 13. In this arrangement of the exhaust gas apparatus 1, the main catalytic converter 15 can be designed as substantially smaller and more economical, since in the λ=1 mode as well, the entire exhaust gas stream is already pre-cleaned by the cold-start three-way catalytic converter 18, which already performs a large proportion of the conversion, and as a result, lesser concentrations of hydrocarbon, carbon monoxide and $NO_x$ are present for conversion at the main catalytic converter 15. In this arrangement of the exhaust gas apparatus 1, it is possible to mount the cold-start three-way catalytic converter 18 especially close to the engine, and as a result, especially fast heating in cold starting and also higher operating temperatures even in the low load range can be attained.

The mixture enrichment (λ<1) often employed as protection against catalytic converter overheating can advantageously be employed to protect against overheating of the cold-start three-way catalytic converter 18; in an installation somewhat farther away from the engine, as shown for instance in FIG. 1, it is even possible to dispense entirely with this form of catalytic converter overheating protection, in certain models.

The first catalytic converter 9 is preferably provided with a reaction layer 20 which comprises the elements of platinum and/or rhodium or a combination of these elements and/or has these elements, in order advantageously to increase the $NO_2$ proportion of the exhaust gas stream upstream of the selective catalytic converter 11; a conventional palladium/rhodium layer known from the prior art cannot accomplish such an advantageous increase in the $NO_2$ component in the desired manner.

The foregoing relates to the preferred exemplary embodiments of the invention, it being understood that other variants and embodiments thereof are possible within the spirit and scope of the invention, the latter being defined by the appended claims.

The invention claimed is:

1. An exhaust gas apparatus of an internal combustion engine, comprising:
   at least one selective catalytic converter;
   a first catalytic converter disposed upstream of the at least one selective catalytic converter;
   an inlet point of reducing agent of the selective catalytic converter, the first catalytic converter being disposed upstream of the inlet point of reducing agent; and
   a second catalytic converter disposed downstream of the selective catalytic converter;
   wherein the first catalytic converter is a three-way catalytic converter and the proportion of exhaust gas which passes through the selective catalytic converter before being treated in the second converter is adjustable by a volume-adjusting and closure device, the volume-adjusting and closure device permitting a continuously variable adjustment of the proportion of exhaust gas which passes through the selective catalytic converter, and
   wherein the volume-adjusting and closure device is connected in parallel to a series circuit of the first catalytic converter and the selective catalytic converter.

2. The exhaust gas apparatus as defined by claim 1, wherein an entirety of an exhaust gas stream from the engine flows through the first catalytic converter when the volume-adjusting and closure device is in a closed state.

3. The exhaust gas apparatus as defined by claim 1, wherein one catalytic converter has a reaction layer, which comprises at least one of the elements platinum and rhodium.

4. The exhaust gas apparatus as defined by claim 1, wherein one catalytic converter has a reaction layer, which has the elements platinum and rhodium.

5. The exhaust gas apparatus as defined by claim 1, wherein the second catalytic converter follows a parallel circuit of the volume-adjusting and closure device on the one hand and follows the series circuit of the first catalytic converter and the selective catalytic converter on the other.

6. The exhaust gas apparatus as defined by claim 5, wherein an entirety of an exhaust gas stream from the engine flows through the first catalytic converter when the volume-adjusting and closure device is in a closed state.

7. The exhaust gas apparatus as defined by claim 5, wherein one catalytic converter has a reaction layer, which comprises at least one of the elements platinum and rhodium.

8. The exhaust gas apparatus as defined by claim 5, wherein one catalytic converter has a reaction layer, which has the elements platinum and rhodium.

* * * * *